US007808716B2

(12) United States Patent
Lu et al.

(10) Patent No.: US 7,808,716 B2
(45) Date of Patent: Oct. 5, 2010

(54) PHOTONIC CRYSTAL DEVICES USING NEGATIVE REFRACTION

(75) Inventors: Wentao T. Lu, Malden, MA (US); Srinivas Sridhar, Newton, MA (US); Plarenta Vodo, Malden, MA (US); Patanjali Parimi, Belmont, MA (US); Yongjian Huang, Malden, MA (US)

(73) Assignee: Northeastern University, Boston, MA (US)

( * ) Notice: Subject to any disclaimer, the term of this patent is extended or adjusted under 35 U.S.C. 154(b) by 117 days.

(21) Appl. No.: 11/920,613

(22) PCT Filed: May 16, 2006

(86) PCT No.: PCT/US2006/019021

§ 371 (c)(1),
(2), (4) Date: Nov. 16, 2007

(87) PCT Pub. No.: WO2006/124962

PCT Pub. Date: Nov. 23, 2006

(65) Prior Publication Data

US 2009/0086322 A1 Apr. 2, 2009

Related U.S. Application Data

(60) Provisional application No. 60/681,521, filed on May 16, 2005.

(51) Int. Cl.
*G02B 9/00* (2006.01)
*G02F 1/00* (2006.01)

(52) U.S. Cl. ............... 359/642; 359/741; 359/322; 257/432

(58) Field of Classification Search ............... 359/642, 359/741, 796
See application file for complete search history.

(56) References Cited

U.S. PATENT DOCUMENTS

| 6,618,209 | B2 | 9/2003 | Nishioka et al. | |
|---|---|---|---|---|
| 2001/0012149 | A1 | 8/2001 | Lin et al. | |
| 2006/0237739 | A1* | 10/2006 | Shono et al. | 257/98 |
| 2008/0165079 | A1* | 7/2008 | Smith et al. | 343/911 R |

OTHER PUBLICATIONS

Chiyan Luo et al., All-angle negative refraction in a three-dimensionally periodic photonic crystal; American Institute of Physics, Sep. 23, 2002; Applied Physics Letters, vol. 81, No. 13.
P.V. Parimi et al., Negative Refraction and Left-Handed Electromagnetism in Microwave Photonic Crystals; The American Physical Society, Mar. 26, 2004; Physical Review Letters, vol. 92, No. 12.

* cited by examiner

*Primary Examiner*—Jordan M. Schwartz
(74) *Attorney, Agent, or Firm*—Weingarten, Schurgin, Gagnebin & Lebovici LLP

(57) ABSTRACT

Negative refraction in photonic crystals and diffraction grating is used to design plano-concave lenses to focus plane waves. Microwave experiments are carried out to demonstrate negative refraction and the performance of these lenses. Demonstration of negative refraction of visible light is also performed for the grism. These lenses can be used in optical circuits, astronomical applications, etc.

15 Claims, 11 Drawing Sheets

PHOTONIC CRYSTAL DEVICES USING NEGATIVE REFRACTION

CROSS REFERENCE TO RELATED APPLICATIONS

This application claims the benefit under 35 U.S.C. §119 (e) of U.S. Provisional Patent Application No. 60/681,521, filed on May 16, 2005, the disclosure of which is incorporated by reference herein.

STATEMENT REGARDING FEDERALLY SPONSORED RESEARCH OR DEVELOPMENT

This invention was made under Air Force Research Laboratories, Hanscom AFB, Contract No. F33615-01-1-1007 and NSF Grant No. PHY-0457002. The government has certain rights in this invention.

BACKGROUND OF THE INVENTION

Two types of materials can exhibit negative refraction and thus possess negative refractive indices. One is the wire and split-ring resonator metamaterial. The other is the photonic crystal.

A metamaterial has a crystal structure which has a lattice spacing much less than the operating wave length. The mechanism is to invoke electric and magnetic resonances so that this artificial structure can have negative permittivity and permeability simultaneously. Since the material has negative refraction only in the neighborhood of resonances, high loss is expected. This severely restricts the application of this type of material.

A photonic crystal uses a completely different mechanism to achieve negative refraction. A photonic crystal is a crystal with periodic variation of either permittivity such as dielectric photonic crystals or permeability such as magnetic photonic crystals. With high contrast of the dielectric constants of the component materials of the photonic crystal, the frequency and wave vector dispersion relation is strongly modulated compared with homogeneous media. In general the wave vector and the group velocity in the crystal are neither parallel nor anti-parallel to each other. At certain frequencies, the group velocity and/or wave vector refract negatively. A photonic crystal has the advantage that the design can be scaled to any frequency from radio frequencies to optical, and even X-rays.

SUMMARY OF THE INVENTION

A plano-concave lens made from one-dimensional (1D) broadband left-handed photonic crystal is provided to focus incident plane waves to a point. Negative refraction of plane waves and plano-concave lens focusing is achieved by 1D photonic crystals. The focal length follows the standard laws of geometrical optics combined with negative refraction. Also, a plano-concave lens made from two-dimensional (2D) left-handed photonic crystal having negative refraction is also provided to focus incident plane waves to a point. Additionally, a three-dimensional (3D) plano-concave lens is also provided to focus incident plane waves to a point.

In another embodiment, a plano-concave lens with a spherical refracting corrugated surface acting as a grating using selective diffraction of minus one order is provided for focusing of plane waves to a point. A homogeneous prism with surface grating in the form of surface corrugations is provided to show negative refraction of incident plane wave beams.

In a further embodiment, a plano-concave lens composed of homogeneous material of sufficiently large refractive index with aspherical corrugated surface acting as a diffraction grating displays minimum aberration and optimum focusing.

DESCRIPTION OF THE DRAWINGS

The invention will be more fully understood from the following detailed description taken in conjunction with the accompanying drawings in which:

FIG. 1A also illustrates the microwave focusing experimental setup.

As seen in FIG. 6A, from 3-5 GHz all energy is internally reflected and not transmitted. Measurement was performed between 3-11.5 GHz.

DETAILED DESCRIPTION OF THE INVENTION

Figures 1A, 1B:
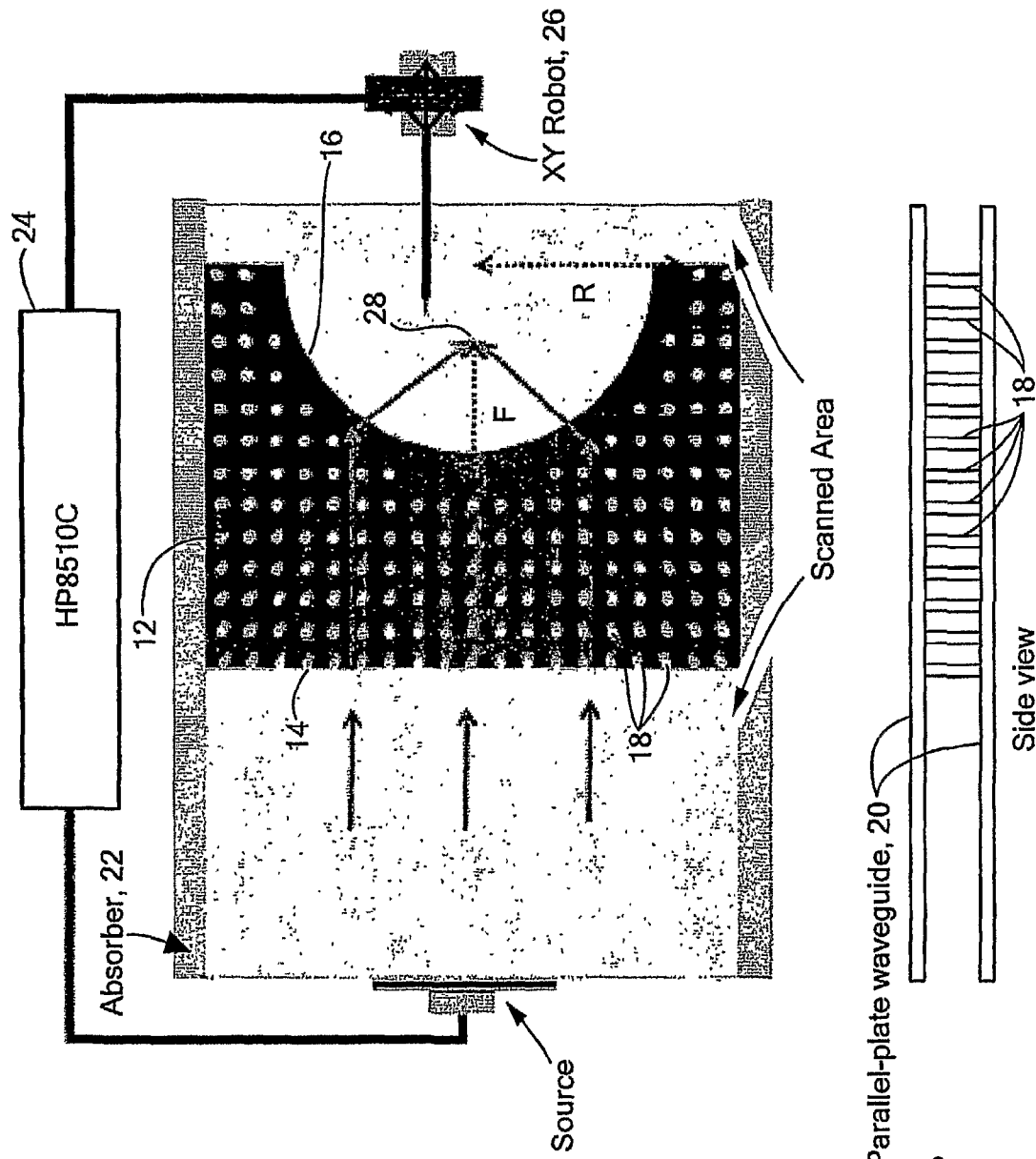
FIG. 1A is a schematic diagram of a two-dimensional photonic crystal for focusing incident plane waves to a point.
FIG. 1B is a side view of FIG. 1A.

The present invention relates to a dielectric photonic crystal having a negative refractive index used for focusing of electromagnetic radiation. Referring to FIGS. 1A and 1B, a plano-concave lens 10 is formed from a dielectric photonic crystal 12. The lens includes one planar face 14 and one concavely curved circular face 16. The lens is comprised of a two-dimensional periodic array of rods 18 of a suitable material, such as alumina or silicon, arranged in a square lattice in a medium such as air. A waveguide 20 directs electromagnetic radiation toward the planar face. The lens can be used with any frequency of electromagnetic radiation; it is particularly useful with microwave or optical frequencies. Alumina is a suitable material for microwave frequencies; silicon is a suitable material for optical frequencies. Other materials with high dielectric constant and low loss can also be used to fabricate the photonic crystals. An absorber 22 is used to form a microwave beam. A network analyzer 24 and X-Y motor 26 are detecting apparatus used for experimentation and set up. These elements are not present in the actual device. The propagation of the wave in the photonic crystal is along the ΓX direction (along the normal of the first flat surface) of the first Brillouin zone. The waves negatively refract at the curved face 16 and converge at a focal point 28.

In one embodiment, the lens is formed from a periodic array of alumina rods in air, arranged in a square lattice. The dielectric constant $\epsilon$ is 8.9 for microwaves. The ratio of the radius of the alumina rods to the lattice spacing is r/a=0.175. The rod height h is determined by the radius of the rods, such that the frequencies of negative refraction are less than the cutoff frequency c/2 h of the parallel-plate waveguide. One can use any height of the rods if the incident microwave or light is polarized along the axis of the rods. It will be appreciated by those of skill in the art that the height of the rods, the rod diameter, and the lattice spacing (center-to-center spacing between adjacent rods) depend on the wavelength of the incoming radiation to be focused. Any other shapes of rods such as square rods can also be used as long as they are easy to fabricate. Other lattices than square lattices, such as triangle lattices, honeycomb lattices or kagome lattices, can also be used. Instead of rod pillars, air holes can also be used. The rod or hole size, its dielectric constant, the crystal structure, lattice spacing are determined by the band structure for a targeting frequency range with optimal performance.

Figure 2:
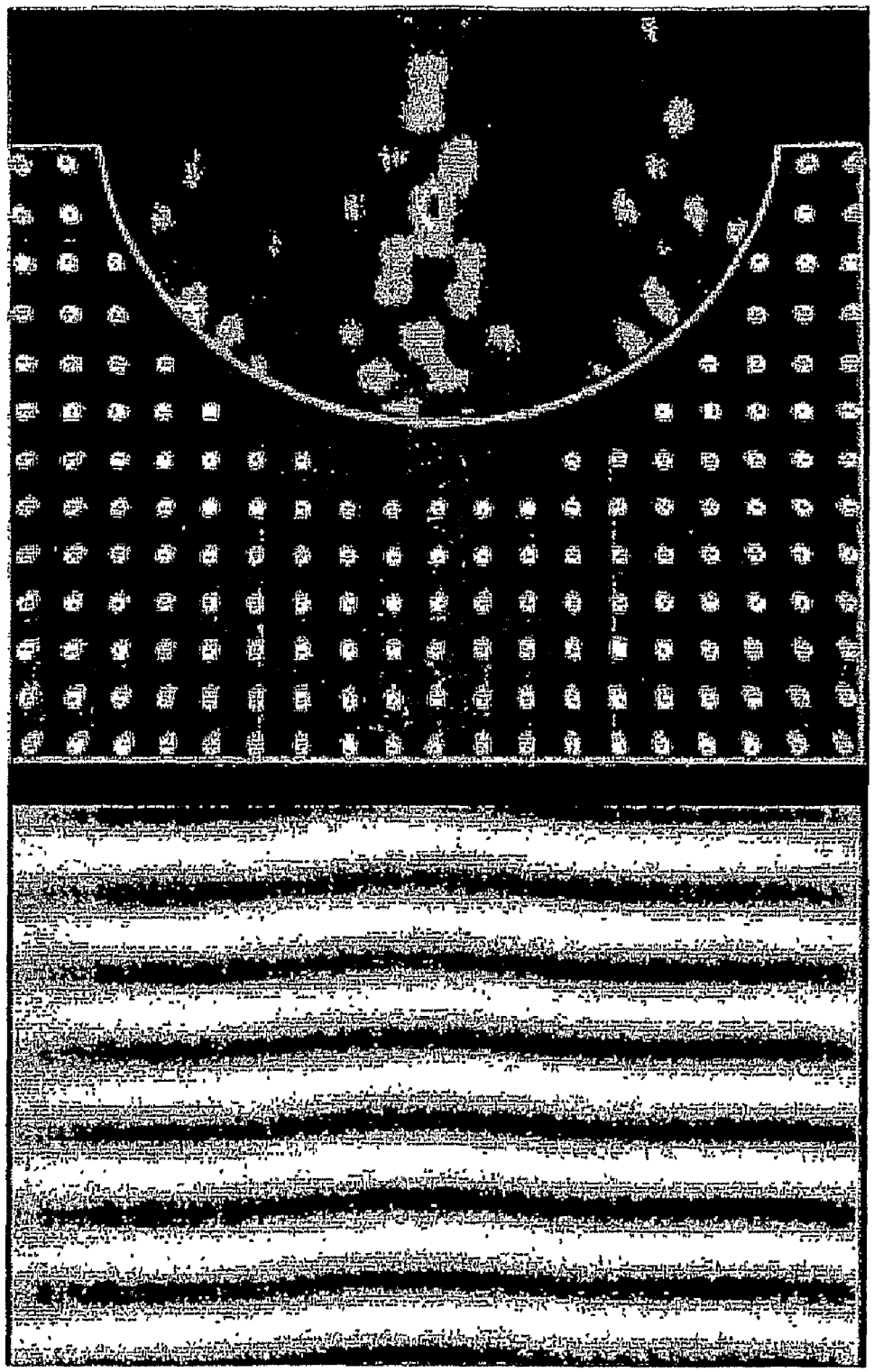
FIG. 2 illustrates an experimental demonstration of focusing by one embodiment of a 2D plano-concave photonic crystal lens having radius of curvature 13.5 cm. The focus point observed at 9.31 GHz is 10.1 cm from the concave lens surface. A photograph of the photonic crystal is superimposed on two MATLAB surface plots of experimental data to obtain the final figure. A dark strip in the center is a schematic representation of the area between the lens and the incoming wave. On the left side, a field map of the incoming plane wave is shown (real part of transmission coefficient) and on the right side, intensity of the focus point is shown. Regarding the scale, on the left, the real part of $S_{21}$ varies from −0.025 to 0.025, and on the right side, intensity varies from 0 to $1.6 \times 10^{-3}$. Dimensions of the figure are $49 \times 34$ cm$^2$. The lattice spacing is 1.8 cm and the packing density of the square lattice is determined from the ratio r/a=0.175.
Figure 3:
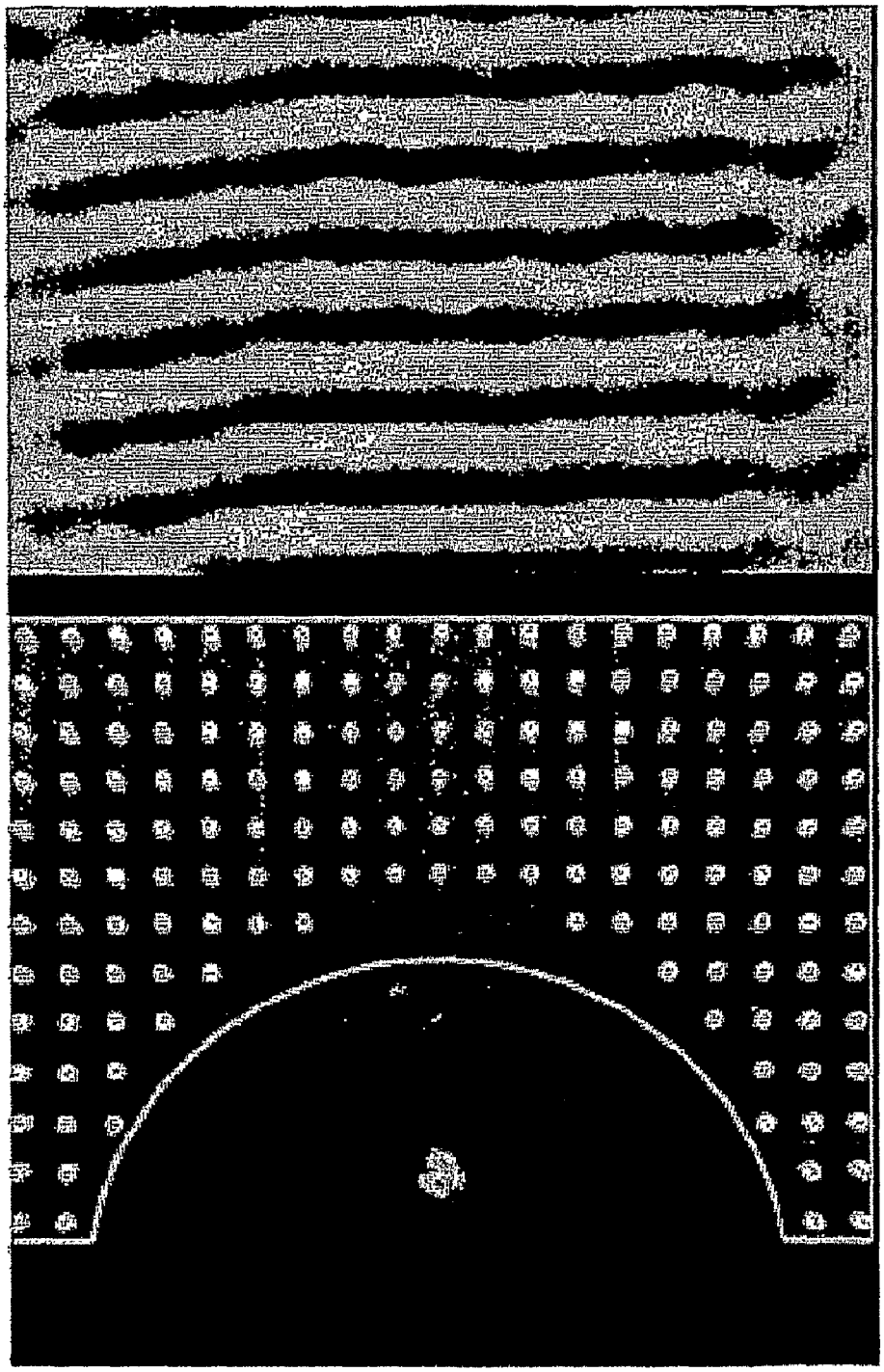
FIG. 3 illustrates experimental field maps of the inverse of FIG. 2, showing an incident source at the focal point and the emerging plane wave. Regarding scale, on the left side, intensity varies from 0.005 to 0.055, and on the right side, the real part of $S_{21}$ varies from −0.025 to 0.015. Dimensions of the figure are $49 \times 34$ cm$^2$.

Microwave focusing measurements were carried out using three plano-concave lenses made of a dielectric photonic crystal. The radii of curvature of the lenses were 13.5, 17.5, and 22 cm. The experimental setup is also shown in FIG. 1. Microwave measurements were carried out in a parallel plate waveguide. An X-band waveguide kept at a distance of 150 cm from the flat surface of the lens acted as a microwave source. The emitted wave travels through the parallel-plate waveguide and the eventual plane wave is made incident on the flat surface of the lens. The propagation of the wave inside the photonic crystal is along ΓX direction of the Brillouin zone. Field maps of the incoming plane wave and the emerging radiation, on the far side, are captured using a monopole sensor on a ground plane, as shown in FIG. 2. The sensor is hooked up to an automated X-Y translational stage which scans for the electric-field component of the microwaves in the region of interest. An HP-8510C network analyzer is used for measuring the transmission characteristics. An inverse experiment is shown in FIG. 3 where a plane wave beam is emerging from a point source at the focal point through the plano-concave lens.

Figure 4:
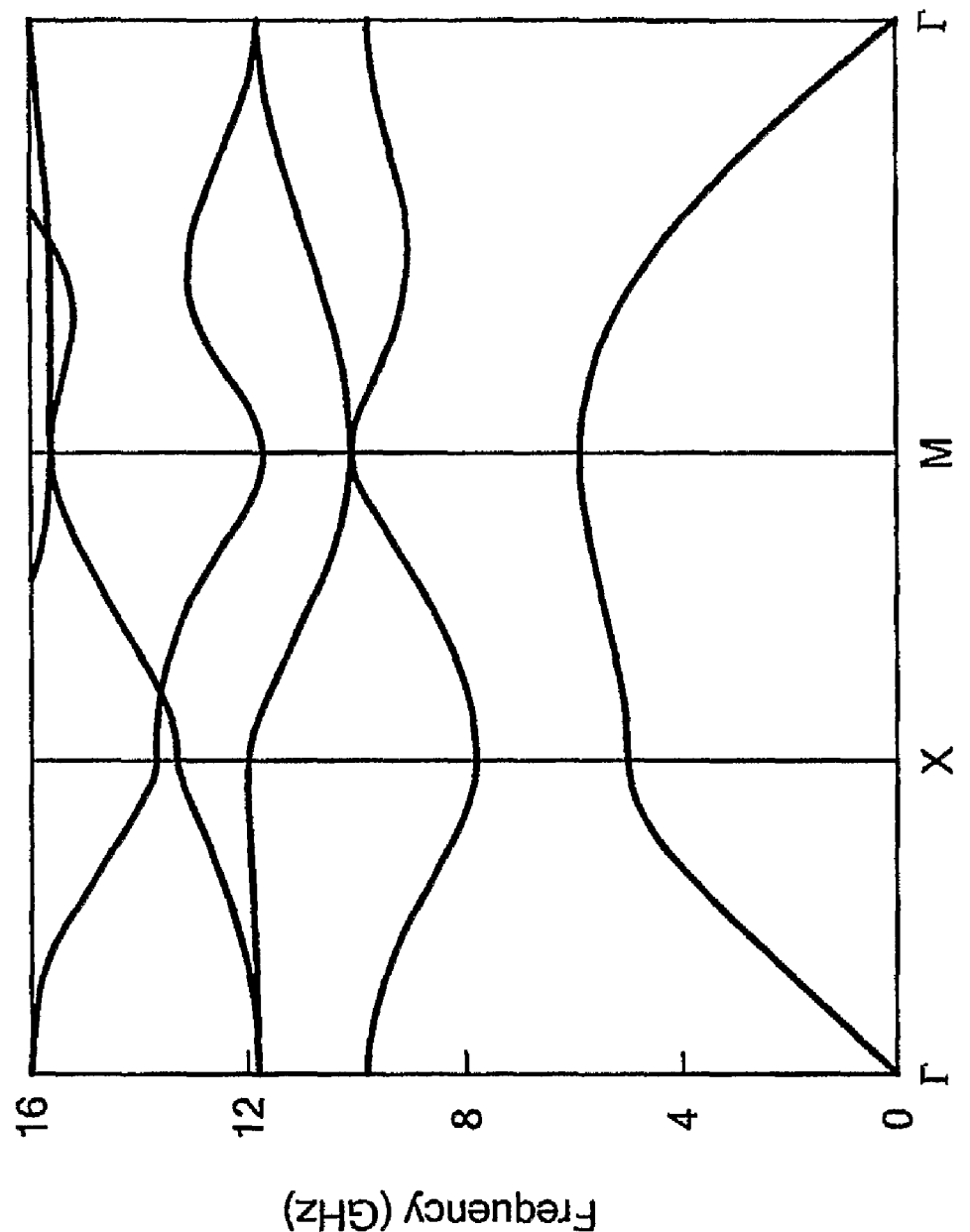
FIG. 4 illustrates the band structure of the photonic crystal calculated from the plane wave expansion method.

The measured values of the refractive indices of the lens are in agreement with those determined from band structure calculations from both refraction and focusing experiments. The band structure is calculated by using the standard plane wave expansion method. The refractive index for the phase velocity is $n_p=(k/\omega)\mathrm{sgn}(k \cdot v_g)$. The corresponding band structure of the photonic crystal is shown in FIG. 4.

A photonic crystal lens with negative refraction provides advantages over a conventional material with positive refraction. Lenses with reduced geometric aberrations produce sharper images with enhanced resolution. A larger radius of curvature reduces aberrations in the image formed. A photonic crystal lens having the same focal length as that of a conventional lens weighs far less. The ability to tailor the refractive index with photonic crystal materials provides control over the focal length, which helps to reduce the length of the optical system.

Figure 5B:
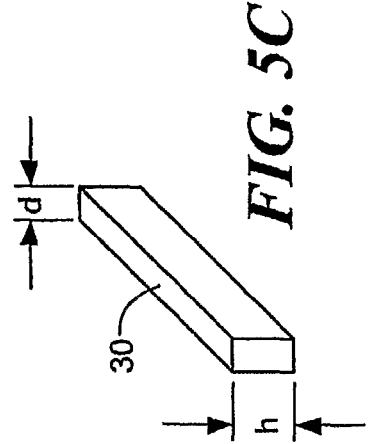
FIG. 5B is a schematic top view illustrating bars forming the photonic crystal of FIG. 5A.
Figure 5C:
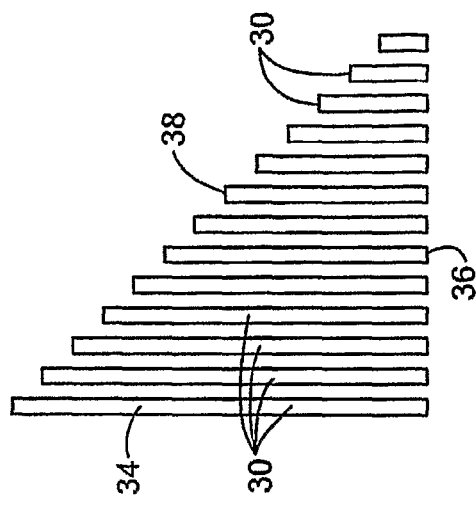
FIG. 5C is in isometric view of a single bar forming the photonic crystal of FIGS. 5A and 5B.
Figure 5A:
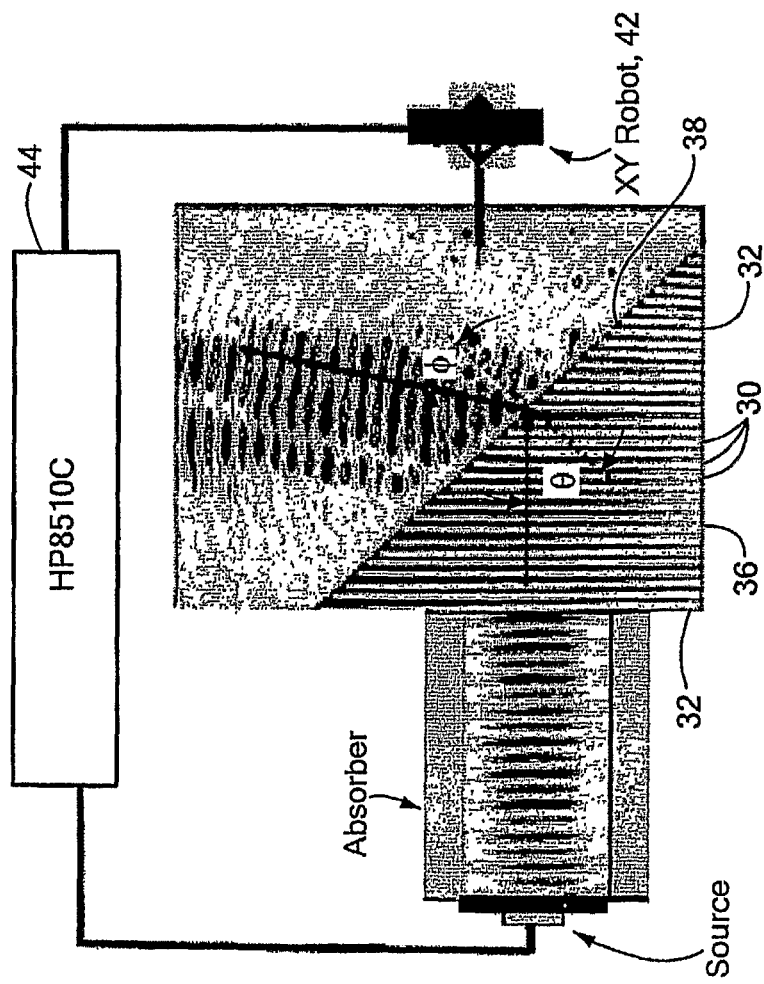
FIG. 5A illustrates a schematic diagram of a one dimensional (1D) photonic crystal prism with negative refraction of plane waves and the microwave experimental setup therefor. In one embodiment, the angle of incidence θ is 45° and angle of refraction φ is 36.9° resulting in negative refraction with refractive index $n_p$=−0.85 at 10.55 GHz. The real part of $S_{21}$ scale on the left side varies from −0.015 to 0.015, and on the right side from −0.006 to 0.006.

In another aspect of the present invention, negative refraction is achieved in one-dimensional photonic crystals as well. Referring to FIGS. 5A-C, a plurality of bars 30 of different lengths is laid out in a parallel arrangement to form a prism 32 of a right angle triangle defined by two right angle surfaces 34, 36 and a hypotenuse 38. The first right angle surface 34 is defined by the first bar. The other right angle surface 36 is defined by the aligned ends of the plurality of bars. The hypotenuse 38 is defined by the opposite ends of the bars, which form a staggered pattern. A plane wave incident normally to the first surface (incident angle θ at the hypotenuse) is refracted (angle φ) by the hypotenuse of the 1D prism, as indicated in FIG. 5A.

In one embodiment, suitable for use with microwave radiation, a parallel-plate waveguide is provided having a height h=1.25 cm, length of 6 ft, width of 3 ft (3×6 ft²). For frequencies below 12 GHz, the excitation in this quasi-2D system is the transverse magnetic (TM) modes with the electric field in the vertical direction. Alumina bars with permittivity $\epsilon=8.9$ were laid out to form a prism of a right angle triangle. The bars have a height h=1.25 cm and width d=0.5 cm. In one case (PC1), the prism has a lattice constant a=1 cm and the incident angle is θ=45°. In another case (PC2), the prism has a lattice constant of a=0.8 cm and the incident angle is θ=51°. The bars preferably have a perpendicular cut (see FIGS. 5B and 5C), rather than a slanted cut to reduce the modulations of the outgoing waves, partly due to the absence of sharp corners.

The electric field of the microwaves were scanned using a monopole antenna attached to an X-Y robot 40 in the frequency window 3-11.5 GHz. An HP-8510C network analyzer 42 was used for measuring the transmission characteristics. A schematic diagram of the experimental setup is shown in FIG. 5A. The average power of the scanned points is plotted as a function of frequency in FIG. 6A.

Figure 7:
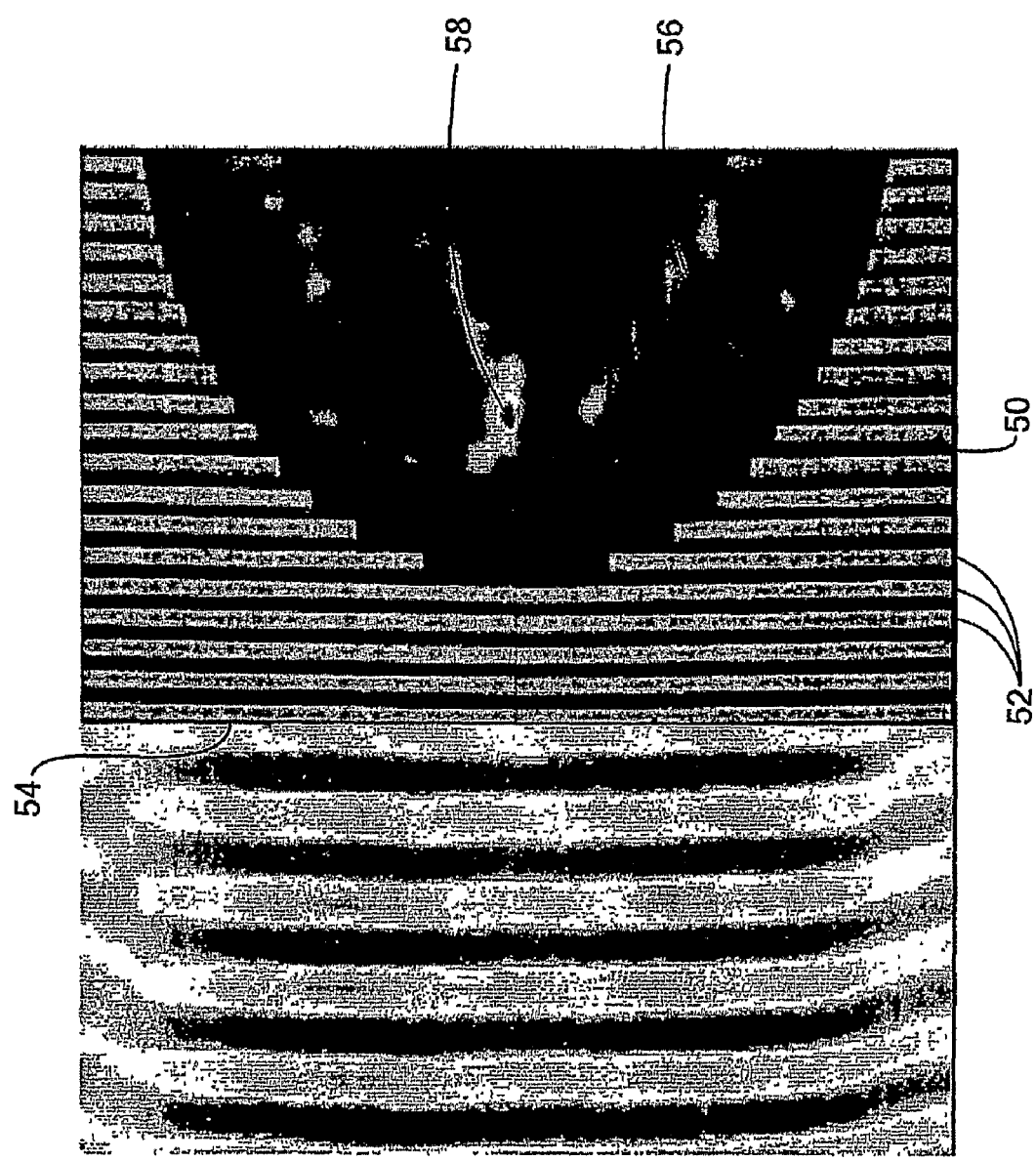
FIG. 7 illustrates focusing by a 1D plano-concave photonic crystal lens embodiment having radius of curvature R=18 cm. The focus point observed at 9.5 GHz is 6.15 cm from the concave lens surface. A photograph of the photonic crystal is superimposed to obtain the final figure. On the left side, a field map of the incoming plane wave is shown (real part of transmission coefficient), and on the right side, intensity of the focus point. Regarding scale, on the left side, from −0.03 to 0.03, on the right side, from 0 to 4×10⁻³. Dimensions of the lens are 19×38 cm².
Figure 8:
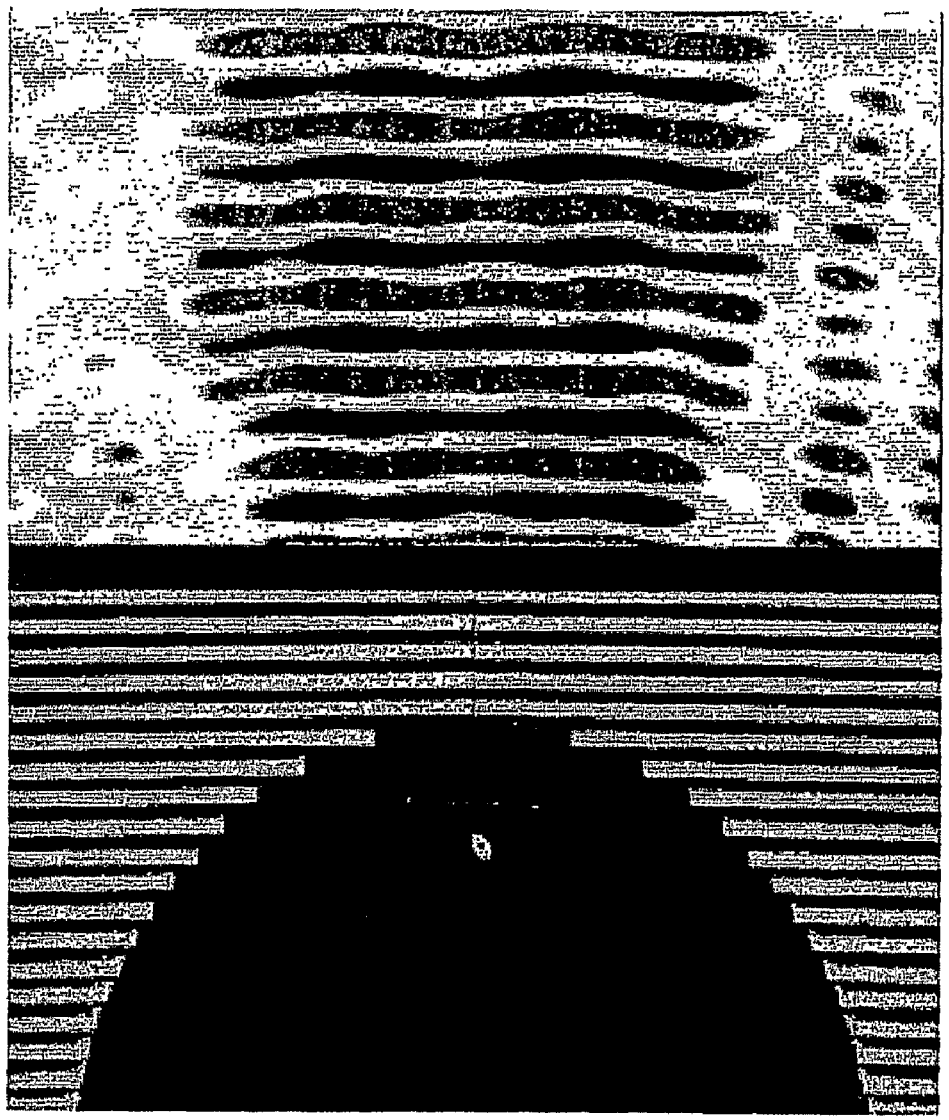
FIG. 8 illustrates field maps of the inverse of FIG. 7 showing an incident source at the focal point and the emerging plane wave. Regarding scale, on the left side, intensity varies from 0 to 0.14, and on the right side, the real part of $S_{21}$ varies from −0.03 to 0.02. The source is placed at the focal length 6.15 cm and plane wave is observed at 9.55 GHz.
Figure 9:
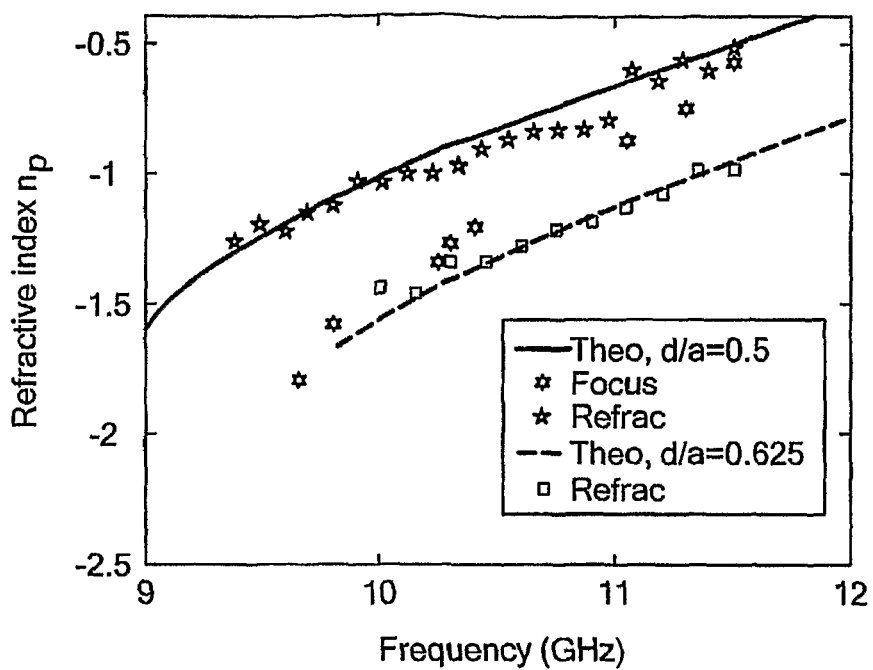
FIG. 9 illustrates refractive indices $n_p$ determined from the focusing and refraction experiments for the TM modes of the 1D dielectric photonic crystals with $\epsilon=8.9$. The solid line is for a first photonic crystal (PC1) having d/a=0.5, and the dashed line is for a second photonic crystal (PC2) having d/a=0.625.

FIG. 7 illustrates a one dimensional plano-concave lens 50 formed from a series of parallel bars 52. The bars have varying lengths to form a planar surface 54 and a concave surface 56. The concave surface is a semi-circle. A sharp focal point 58 is located at 6.15 cm away from the curved surface 56 of the plano-concave lens 50 when a microwave beam incidents at frequency 9.5 GHz. From left to right in FIG. 7, the incoming plane wave, a real picture of the photonic crystal lens and the emerging mapped field are shown. Clear focusing is observed in the frequency range 9.2-11.5 GHz. An inverse experiment in which a point source is placed at the observed focal point of the lens at a single frequency was also carried out. As shown in FIG. 8, a circular wave front from the point source after passing through the lens emerges as a plane wave. These two results validate the behavior of a left-handed plano-concave lens. The refractive indices $n_p$ determined from the prism refraction experiments (PC1 and PC2) and the plano-concave lens experiment are shown in FIG. 9. Very good agreement with those calculated from the band structure is observed.

Figure 6B:
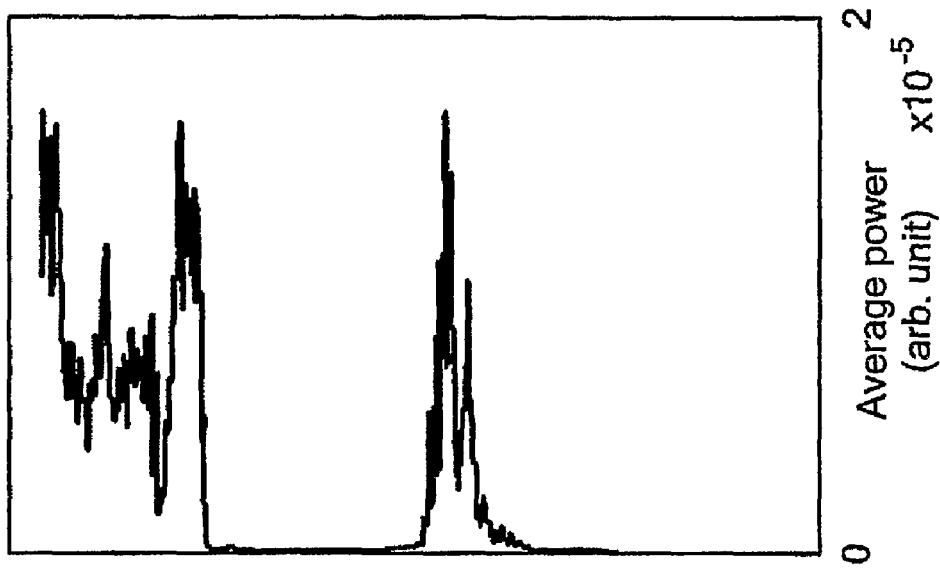
FIG. 6B illustrates frequency versus average outgoing power, calculated as the average of $|S_{21}|^2$ in the scanned area.
Figure 6A:
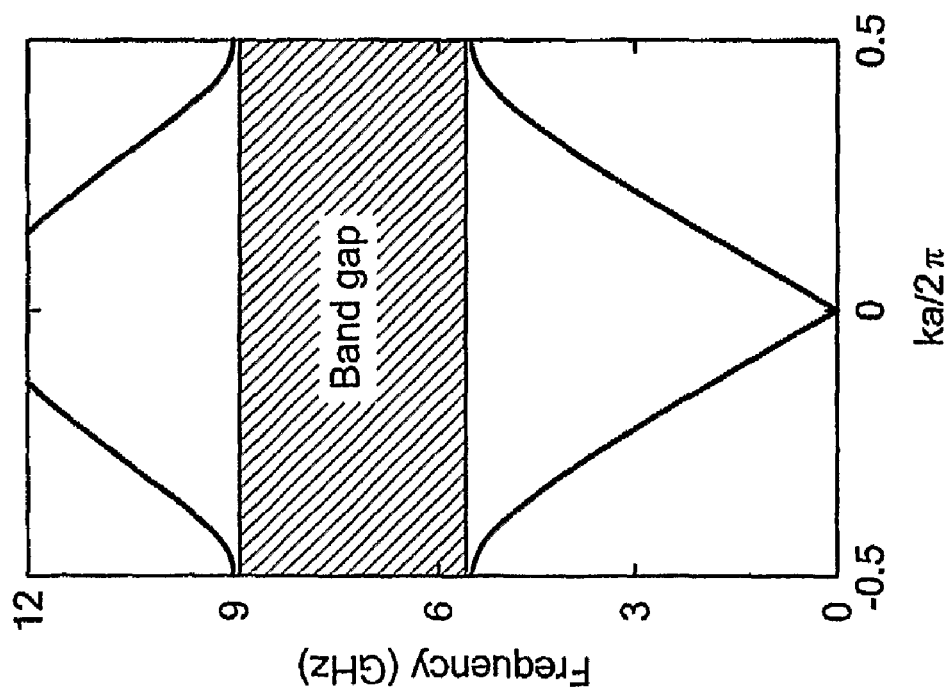
FIG. 6A illustrates the band structure of the TM modes of the 1D photonic crystal with a=1 cm, d=0.5 cm, and ∈=8.9.

The 1D photonic crystal is a model that is exactly soluble. For the TM modes, it is just the Kronig-Penny model with an energy dependent potential. The band structure for the TM modes for the filling factor d/a=0.5 is shown in FIG. 6A. A band gap is located between 5.55-8.9 GHZ. The second pass band is between 8.9-12.7 GHZ and has negative refractive index. The refraction of a microwave beam by the PC1 prism at 10.55 GHz is shown in FIG. 5. By fitting the outgoing beam with a plane wave, the wave front is determined and an effective index $n_p=-0.85$ is obtained using Snell's law.

Figure 10:
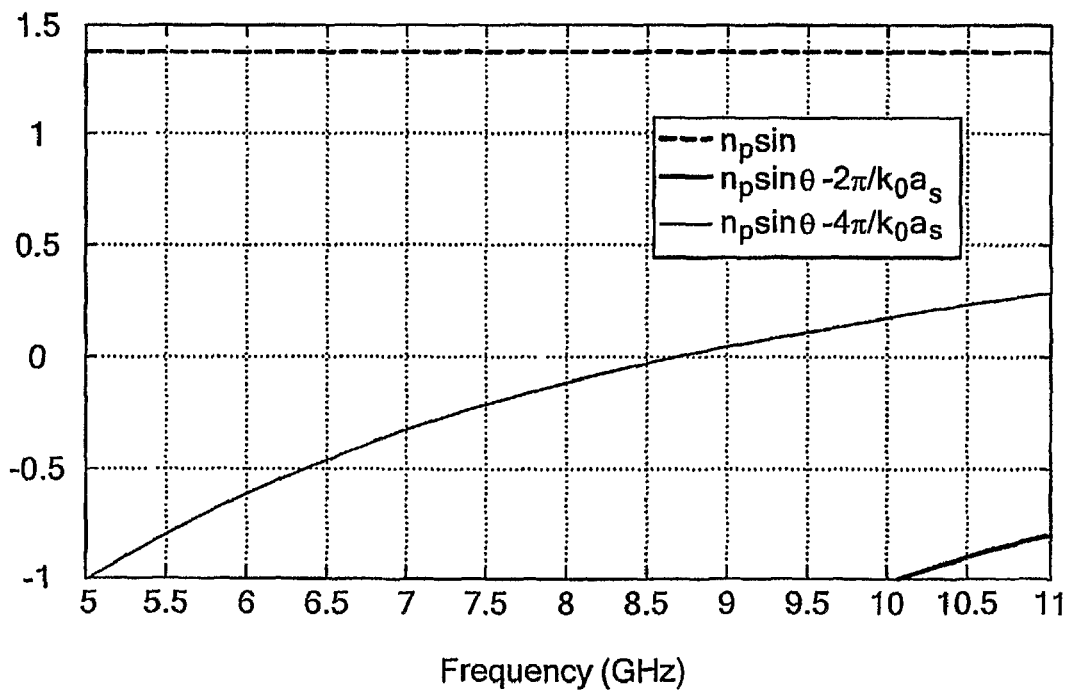
FIG. 10 illustrates the range of negative and positive refraction of a diffraction grating prism with refractive index n=1.58 and $a_s$=2 cm.

In another embodiment, a diffraction grating is deposited or created using surface corrugation on one surface of the prism (grism) or on the concave surface of the plano-concave lens. The present invention achieves negative refraction by selective diffraction grating of the minus one order. Consider a right angle prism of glass (n~1.58). Consider an incident wave normal to one of the shorter side. The incident angle at the hypotenuse is $\theta=\lambda/4$. Since n sin($\theta$)>1, the beam experiences total internal refraction. No beam is refracted at the hypotenuse into the air. However if some grating is etched on the hypotenuse like a grism, surface waves are excited and Bragg diffraction waves propagate in the air. If the grating is very sparse, many orders of Bragg diffraction radiate with the component of the wave vector along the surface being $k_{\|m}=nk_0 \sin(\theta)+2m\pi/a_s$. Here $k_0$ is the wave vector in the air, $a_s$ is the grating spacing, and m is the order of the Bragg diffraction. Since n sin($\theta$)>1, only the negative orders of Bragg waves radiate, m<0. However as the grating density increases, many high orders of Bragg waves become evanescent and cease to radiate. At a certain grating density, the Bragg waves of m=−1 and m=−2 radiate. Further increasing the grating density will eliminate the m=−2 order but keep the minus one order. Since there is only one beam coming out of the prism at the hypotenuse and bending negatively, the phenomena of negative refraction instead of diffraction is well defined. It is under this condition that one can achieve negative refraction by selective Bragg diffraction. The case for n=1.58 and $a_s$=2.5 cm is shown in the FIG. 10. From 5-10.1 GHz, the refraction is negative with only the Bragg wave of the m=−1 order, the diffraction is a well-defined refraction.

The effective refractive index is $n_{eff}=n \sin(\theta)-2\pi/k_0 a_s$. However between 5 and 8.7 GHz, $n_{eff}<0$, the m=−1 beam is radiating to the left of the surface normal, thus demonstrating negative refraction. For the frequency among 8.7-10.1 GHz, $n_{eff}>0$, the refraction is positive. Beyond 10.1 GHz, m=−2 is present.

Figure 11:
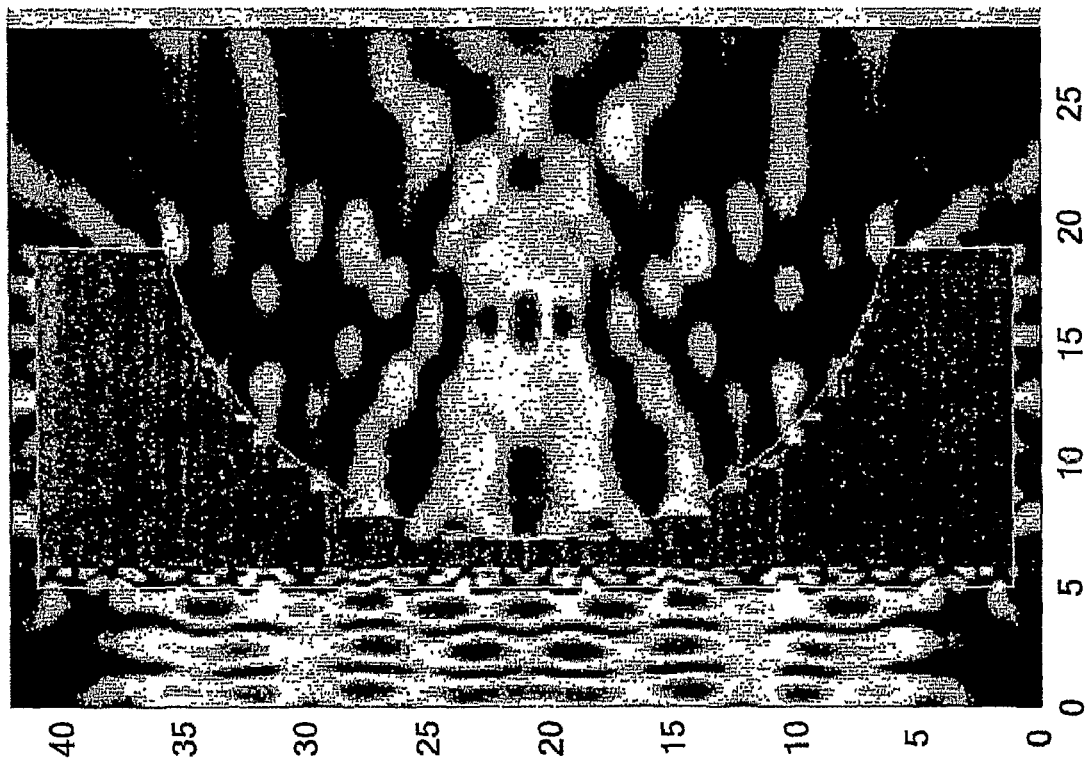
FIG. 11 illustrates focusing of an embodiment of a diffraction grating plano-concave lens at 8.5 GHz. The refractive index is n=3 and a=1 cm.

This mechanism can be used to design optical devices, including devices that use applications such as plano-concave lens focusing and a homogeneous material. Unlike the grism with an evenly spaced grating, the plano-concave lens should have an uneven grating since one of the surfaces that will have the grating is not flat. The grating on the concave surface (a semi-circle) has constant spacing a along the optical axis. Thus the grating periodicity is $a_s=a/\sin(\theta)$. Here $\theta$ is the incident angle of the parallel beam with respect to the normal of the curved surface of the lens. The refracted angle $\phi$ is given by $\sin(\phi)=(n-2\pi/k_0 a)\sin(\theta)$. If n~$2\pi/k_0 a$, a parallel beam is focused into a high quality point image around the center of the semi-circle. A numerical simulation for a circular plano-concave lens operating at 8.5 GHz is shown in FIG. 11. The lens is made of material with refractive index n=3 and has a=1 cm.

Figure 12:
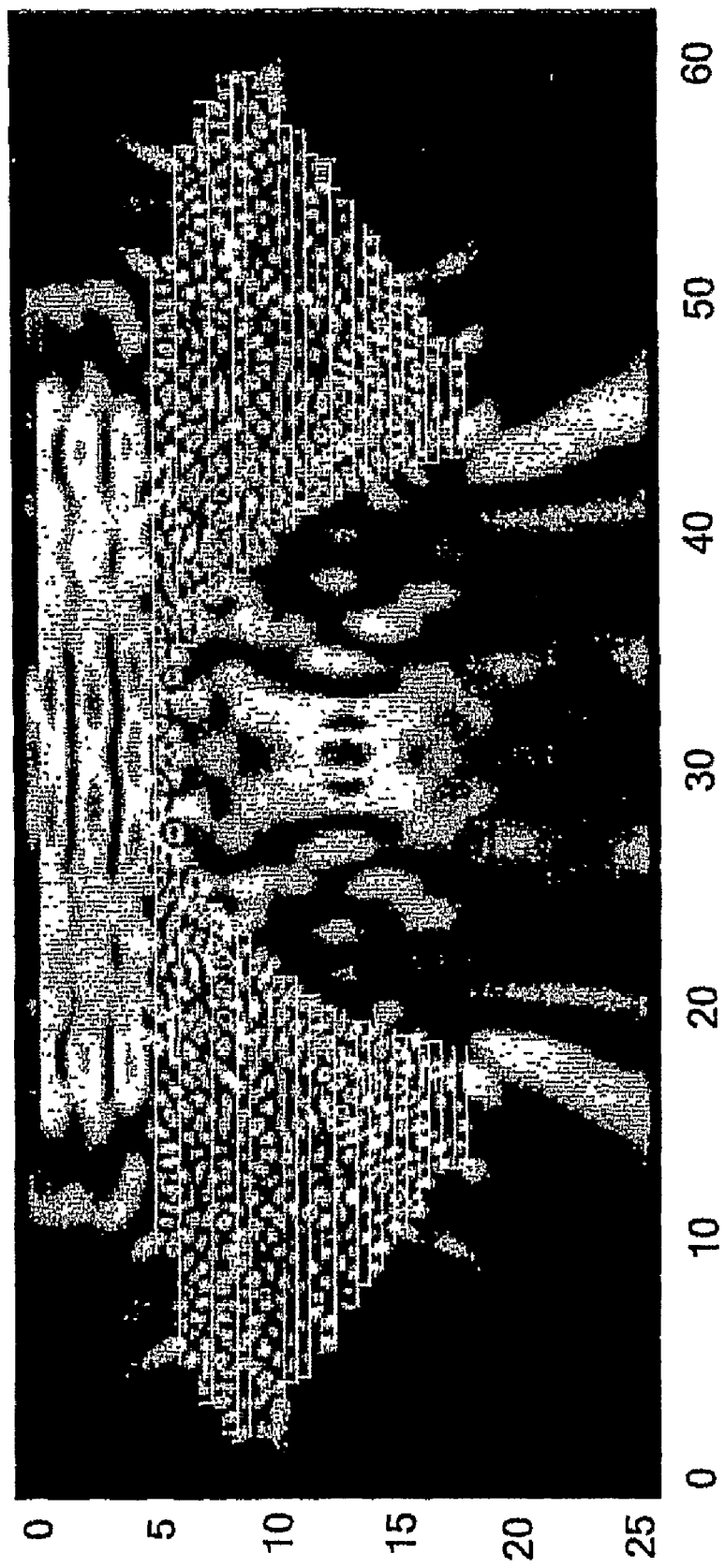
FIG. 12 illustrates an aspherical plano-concave lens of minimum aberration operating at 8.5 GHz.

Use of an aspherical refracting corrugated surface leads to an image with superior focus and minimum aberration. The aspherical curve is elliptic $y^2+(1-n_{eff}^2)(x-x_c)^2=(1-n_{eff}^2)x_c^2$ with $x_c=f/(1+n_{eff})$, where f is the desired focal length and $n_{eff}$ is the refractive index of the homogeneous material. An FDTD simulation showing the superior focus is shown in FIG. 12.

The same examples can be translated to all frequencies in the electromagnetic spectrum. For example at optical frequencies, the designs would be similar but would use silicon as the base dielectric material. The surface corrugation can be either composed of grooves or can be comprised of metallic rulings.

The typical size of these lenses is a few times bigger than the wavelength. These lenses therefore are not designed using the concept of geometric optics. They are of great advantage to be used as optical components in integrated optical circuits, and in microwave communication structures.

The devices of the present invention can be useful in many optical applications, astronomical telescopes, commercial and defense microwave communications.

Although 1D and 2D devices are described, three dimensional (3D) devices can be provided as well, such as in a lattice arranged as shown in FIGS. 1A and 1B.

The invention is not to be limited by what has been particularly shown and described, except as indicated by the appended claims.

What is claimed is:

1. An optical device comprising a photonic crystal lens, said photonic crystal lens comprising:
    a body comprised of a photonic crystal material, the body having a planar face and a concave face;
    the photonic crystal material having a varying permittivity or a varying permeability or a varying permittivity and permeability;
    the photonic crystal material configured to provide negative refraction at the concave face of incident plane waves on the planar face; and
    a wave guide integrally attached to the photonic crystal lens to direct incident radiation on the planar face.

2. The optical device of claim 1, wherein the photonic crystal material is comprised of alumina or silica rods arranged in air.

3. The optical device of claim 1, wherein the body comprises a two-dimensional array of parallel rods arranged in a lattice configuration.

4. The optical device of claim 3, wherein the rods have a circular, square, triangular, or polygonal cross section.

5. The optical device of claim 3, wherein the lattice configuration comprises a square lattice, a triangular lattice, a honeycomb lattice, or a kagome lattice.

6. A photonic crystal lens, comprising:
   a body comprised of a photonic crystal material, the body having a planar face and a concave face;
   the photonic crystal material having a varying permittivity or a varying permeability or a varying permittivity and permeability;
   the photonic crystal material configured to provide negative refraction at the concave face of incident plane waves on the planar face,
   wherein the body comprises a one-dimensional array of parallel rods arranged in parallel, one rod comprising the planar face, and ends of a plurality of rods arranged in a staggered pattern comprising the concave face.

7. The optical device of claim 1, wherein the body comprises a three dimensional array of parallel rods arranged in a lattice configuration.

8. A photonic crystal lens comprising:
   a body comprised of a photonic crystal material, the body having a planar face and a concave face;
   the photonic crystal material having a varying permittivity or a varying permeability or a varying permittivity and permeability; and
   further comprising a diffraction grating of minus one order formed on the concave face;
   wherein incident plane waves on the planar face are negatively refracted at the concave face.

9. The photonic crystal lens of claim 8, wherein the diffraction grating is comprised of staggered ends of a plurality of rods.

10. The optical device of claim 1, wherein the photonic crystal material is operative to transmit microwave radiation.

11. The optical device of claim 1, wherein the photonic crystal material is operative to transmit optical radiation.

12. A circuit comprising the optical device of claim 1.

13. A method of focusing radiation comprising:
   providing optical device the of claim 1;
   directing an incident plane wave onto the planar face of the photonic crystal; and
   negatively refracting the incident radiation at the concave face to a focal point.

14. A method of generating plane waves comprising:
   providing the optical device of claim 1;
   generating radiation from a point source located at a focal point of the concave face of the photonic crystal;
   transmitting a plane wave from the planar face of the photonic crystal.

15. The optical device of claim 1, wherein the photonic crystal material has a negative index of refraction.

* * * * *